2,982,401
PROCESS FOR RECLAIMING BARITE FROM WASTE DRILLING FLUIDS

Charlie F. Talbot, 3715 Turnberry Circle, Houston, Tex.

No Drawing. Filed Apr. 30, 1958, Ser. No. 731,853

4 Claims. (Cl. 209—2)

The present invention relates to a process for recovering or reclaiming barite from waste drilling mud fluids.

In the drilling of wells by the rotary method, it is necessary to supply a drilling fluid or mud to the drill string as the drilling progresses. This drilling mud accomplishes many functions, including the function of carrying the drill cuttings from the bottom of the hole as the well bore is drilled, back up to the earth's surface. At each well location, the drilling mud fluid which is used during the drilling process is discharged into a pit formed into the earth's surface, or tank formed of metal or other suitable material which receives and stores the mud laden fluid as the drilling procedure is carried out, and after the drilling has been completed the used drilling mud is left in the earthern pits. The drilling equipment is, of course, moved to another drilling location.

The drilling mud fluid contains barite,, and as a result of continued drilling operations over a period of years, the domestic sources of barite have gradually become depleted, so that it is now necssary to have barite imported from various countries for use in the drilling operations in the United States. Since many thousands of oil and gas wells have been drilled there is, therefore, a substantial quantity of barite in the waste drilling mud at each drilling site or location.

The present invention provides a process for recovering or reclaiming the barites from these waste drilling fluids so that the barites may be reused in drilling operations.

Therefore, one of the prime objects of the present invention is to provide a process for reclaiming barites from waste drilling fluids.

Still a further object of the present invention is to treat a waste product to recover therefrom the barite for reuse in drilling muds.

Still a further object of the present invention is to provide a process for treating waste drilling fluids so as to separate the barites from the other constituents whereby the barite may be used in future drilling operations.

Still another object of the present invention is to provide a process for collecting and reclaiming barites from waste drilling fluids.

Other objects and advantages of the present invention will become more readily apparent from a consideration of the following description of the invention.

As previously mentioned, the drilling fluids used in drilling oil and gas wells are discharged into earthern pits or other receptacles adjacent the drilling site. In practicing the present invention the waste drilling muds could be collected at various well locations by providing suitable pumping and collection equipment on a vehicle, whereupon the waste from drilling sites could be collected and transported to a suitable treatment area.

Generally speaking, a used drilling mud will contain, not only the desirable barite as a constituent, but will also contain bentonite, dispersing chemicals, and materials such as phosphate, quebracho, tannins, and possibly other chemicals added to the drilling mud during drilling operations. The waste material containing these substances and possibly others is first of all subjected to washing with water so as to remove the soluble components. The barite, which it is desired to recover from the materials, is relatively insoluble and the washing removes those constituents which are soluble, leaving behind the relatively insoluble barite.

In some situations, it is desirable to heat the waste product prior to washing in order to reduce the tendency of the bentonite to swell. The heating may approximate 1200° F., which is generally sufficient to inhibit swelling of the bentonite during the washing step.

Afteer washing out the soluble components, additional components of the original waste material may be separated from the desirable barite by elutriation with water. In the elutriation of the waste product, the insoluble components such as bentonite, clays and any fine drilling cuttings which are present in the waste product will be separated from the heavier barite particles, which in large part will remain in the elutriation vessel.

In order to further purify and separate the barite from the remaining components of the original waste product, the mixture of materials remaining in the elutriataion vessel are then thickened with water to the desired solid content and treated with any one of a plurality of well known chemicals in order to adjust the pH of the conditioned slurry. Chemicals suitable for use in conditioning the slurry and adjusting the pH may be sodium carbonate, sodium silicate, sodium hydroxide, hydrochloric acid, calgon and other similar substances which do not affect the properties of the barite ore present in the slurry, Also, in some situations, it may be desirable to heat the slurry to accelerate the condition, and to aid in the subsequent recovery of the barite from the conditioned slurry during cold weather.

In order to separate the barite from the thickened slurry, a flotation process may be used, wherein the barite is separated by floating it in the froth of the flotation process, or by removing the undesirable constituents from the barite in the froth, leaving the barite ore in the residue.

For example, suitable re-agents such as oleic acid, quebracho, alcohol and fuel oil, if added to the thickened slurry will cause the heavy barite to be lifted in the resulting froth which occurs during the flotation procedure. On the other hand, if acidified amines are added to the thickened slurry, then the barite will remain in the residue and substantially all of the other undesirable constituents remaining in the thickened slurry will separate out into the froth.

The barite, at any event, may then be recovered from the other constituents and dried in any suitable manner so that it can be packaged, as desired, for subsequent handling.

In some situations the barite may tend to agglomerate and if this does occur, the barite may be screened or subjected to other types of classification or sizing in order to provide the desired or proper particle size necessary for commercial use.

From the foregoing process, it seems readily apparent that a substantial amount of barite which is presently useless in the waste products of drilling mud at drilling locations all over the United States, can be recovered and reused. The treataing equipment can be provided on any suitable type of vehicle for traveling on land or water, as may be desired.

The washing steps wherein the soluble components are taken out, may be effected in any well known manner, and any suitable equipment may be provided for this purpose. Also, the elutriation step may be effected in any well known manner, so as to remove from the desirable barite, the bentonite, the clay and any drilling cuttings present in the barite as impurities.

Broadly the invention relates to a process of recovering barites from waste drilling fluids.

What is claimed is:

1. A process of treating used drilling fluids to recover a desirable heavier substance comprising barite constituents therefrom for reuse including the steps of, collecting used drilling mud substances, washing the substances with water to remove soluble components therefrom, elutriating the substances, including the heavier substance comprising barite constituents, remaining after washing to remove the insoluble components including bentonite and drilling cuttings, thickening the heavier substance comprising barite constituents remaining after elutriating to a desired consistency, subjecting the heavier substance comprising barite constituents to a froth flotation to recover the barite constituents from the substance, and drying the recovered heavier substance comprising barite constituents for subsequent use.

2. A process of treating used drilling fluids to recover a desirable heavier substance comprising barite constituents therefrom for reuse including the steps of, collecting used drilling fluid substances including the barite constituents, heating the drilling fluid substances with the barite constituents therein to approximately 1200° F., washing the drilling fluid substances with the barite constituents therein with water to remove soluble components therefrom, elutriating the drilling fluid substances with the barite constituents therein remaining after washing to remove the insoluble components including bentonite and drilling cuttings, thickening the heavier substance including the barite constituents remaining after elutriating to a desired consistency, subjecting the heavier substance including the barite constituents therein to a froth flotation to recover the barite constituents from the substance, and drying the recovered heavier substances comprising the barite constituents for subsequent use.

3. A process of recovering barite from waste drilling fluids including the steps of, collecting waste drilling fluids which contain barite, bentonite, dispersing chemicals, quebracho, and tannins, heating the collected waste to inhibit swelling of the bentonite, washing the heated waste to remove the soluble components from the waste, elutriating the waste with water to separate the bentonite and fine drilling cuttings from the waste, thickening the waste, subjecting the thickened waste to a froth flotation to collect the barite in the froth to separate it from the remainder of the waste, and drying the separated barite.

4. A process of recovering barite from waste drilling fluids including the steps of, collecting waste drilling fluids which contain barite, bentonite, dispersing chemicals, quebracho, and tannins, heating the collected waste to inhibit swelling of the bentonite, washing the heated waste to remove the soluble components from the waste, elutriating the waste with water to separate the bentonite and fine drilling cuttings from the waste, thickening the waste, subjecting the thickened waste to a froth flotation to collect the barite in the residue to separate it from the remainder of the waste which is collected in the froth, and drying the separated barite.

References Cited in the file of this patent

UNITED STATES PATENTS 2,225,973    Brown et al.            Dec. 24, 1940
2,276,075    Wuench               Mar. 10, 1942

OTHER REFERENCES

Bureau of Mines, "Report of Investigation," R.I. 4280, May 1948, pages 27 and 28.

Taggart: "Handbook of Mineral Dressing," 1945, section 3, page 10, section 19, page 109.